(12) United States Patent
Guo et al.

(10) Patent No.: US 10,103,614 B2
(45) Date of Patent: Oct. 16, 2018

(54) VIBRATION MOTOR

(71) Applicants: Shun Guo, Shenzhen (CN); Lubin Mao, Shenzhen (CN); Hongxing Wang, Shenzhen (CN); Biming Zhang, Shenzhen (CN)

(72) Inventors: Shun Guo, Shenzhen (CN); Lubin Mao, Shenzhen (CN); Hongxing Wang, Shenzhen (CN); Biming Zhang, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 164 days.

(21) Appl. No.: 15/416,189

(22) Filed: Jan. 26, 2017

(65) Prior Publication Data

US 2018/0166961 A1   Jun. 14, 2018

(30) Foreign Application Priority Data

Dec. 10, 2016 (CN) ..................... 2016 2 1355753 U

(51) Int. Cl.
*H02K 33/00* (2006.01)
*H02K 33/18* (2006.01)

(52) U.S. Cl.
CPC .................................. *H02K 33/18* (2013.01)

(58) Field of Classification Search
CPC ........ H02K 33/16; H02K 33/18; H02K 33/00; H02K 5/02; H02K 1/12
USPC ......................... 310/13–15, 25, 12.01–12.33
See application file for complete search history.

(56) References Cited

U.S. PATENT DOCUMENTS

| 9,748,827 | B2* | 8/2017 | Dong | H02K 33/16 |
| 9,935,535 | B2* | 4/2018 | Guo | H02K 33/16 |
| 2011/0316361 | A1* | 12/2011 | Park | H02K 33/16 310/25 |
| 2016/0226362 | A1* | 8/2016 | Wang | H02K 33/16 |
| 2017/0110920 | A1* | 4/2017 | Mao | H02K 1/34 |
| 2017/0120298 | A1* | 5/2017 | Mao | B06B 1/045 |

* cited by examiner

*Primary Examiner* — Thanh Lam
(74) *Attorney, Agent, or Firm* — Na Xu; IPro, PLLC

(57) ABSTRACT

A vibration motor is provided in the present disclosure. The vibration motor includes a housing, a magnet module received in the housing and fixedly connected with the housing, the magnet module comprising a main magnet unit as well as a first vice magnet unit and a second vice magnet unit symmetrically disposed on two sides of the main magnet unit, and the main magnet unit being spaced from the first vice magnet unit and the second vice magnet unit to form magnetic gaps, a vibration module, comprising a coil inserted into the magnetic gaps and masses for clamping the coil, and an elastic support, configured for connecting the coil and the masses to suspend the vibration module in the housing. A stop module for limiting the amplitude of the masses is disposed between the masses and the first vice magnet unit and between the masses and the second vice magnet unit.

20 Claims, 6 Drawing Sheets

VIBRATION MOTOR

FIELD OF THE DISCLOSURE

The present disclosure generally relates to vibrator technologies, and more particularly, to a vibration motor applicable to a portable electronic device.

BACKGROUND

With development of mobile communication technologies, portable electronic devices, such as mobile phones, handheld game players, portable multimedia players, or the like, become more and more popular. Portable electronic devices generally include vibration motors for generating tactile feedback.

A typical related Z-axis linear motor includes a vibration module, and the vibration module includes a coil and a mass for clamping the coil. However, the mass in the vibration motor is only limited by means of a shell in the length direction. When the vibration motor drops in the length direction, the coil is easily deformed by impact extrusion of the mass from one side, so that the vibration motor fails.

Therefore, it is desired to provide a vibration motor to overcome the aforesaid problems.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
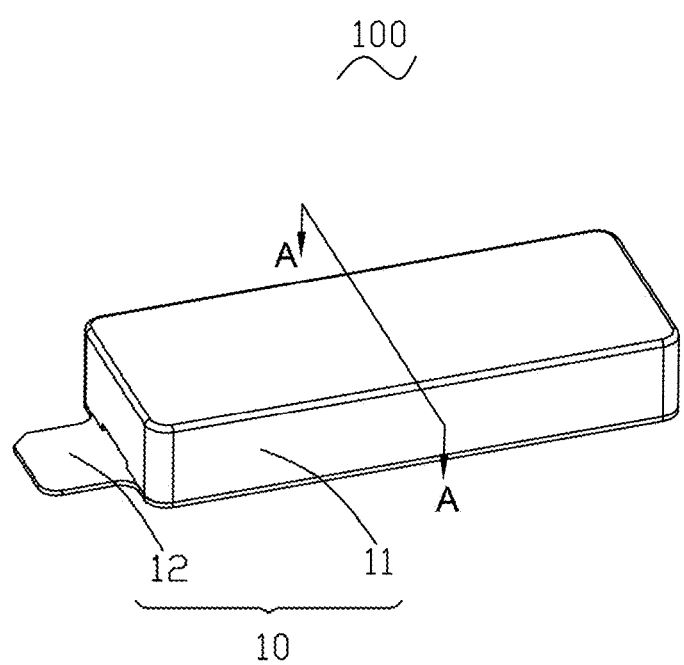
FIG. 1 is a structural schematic diagram of an embodiment of a vibration motor of the present disclosure.
Figure 2:
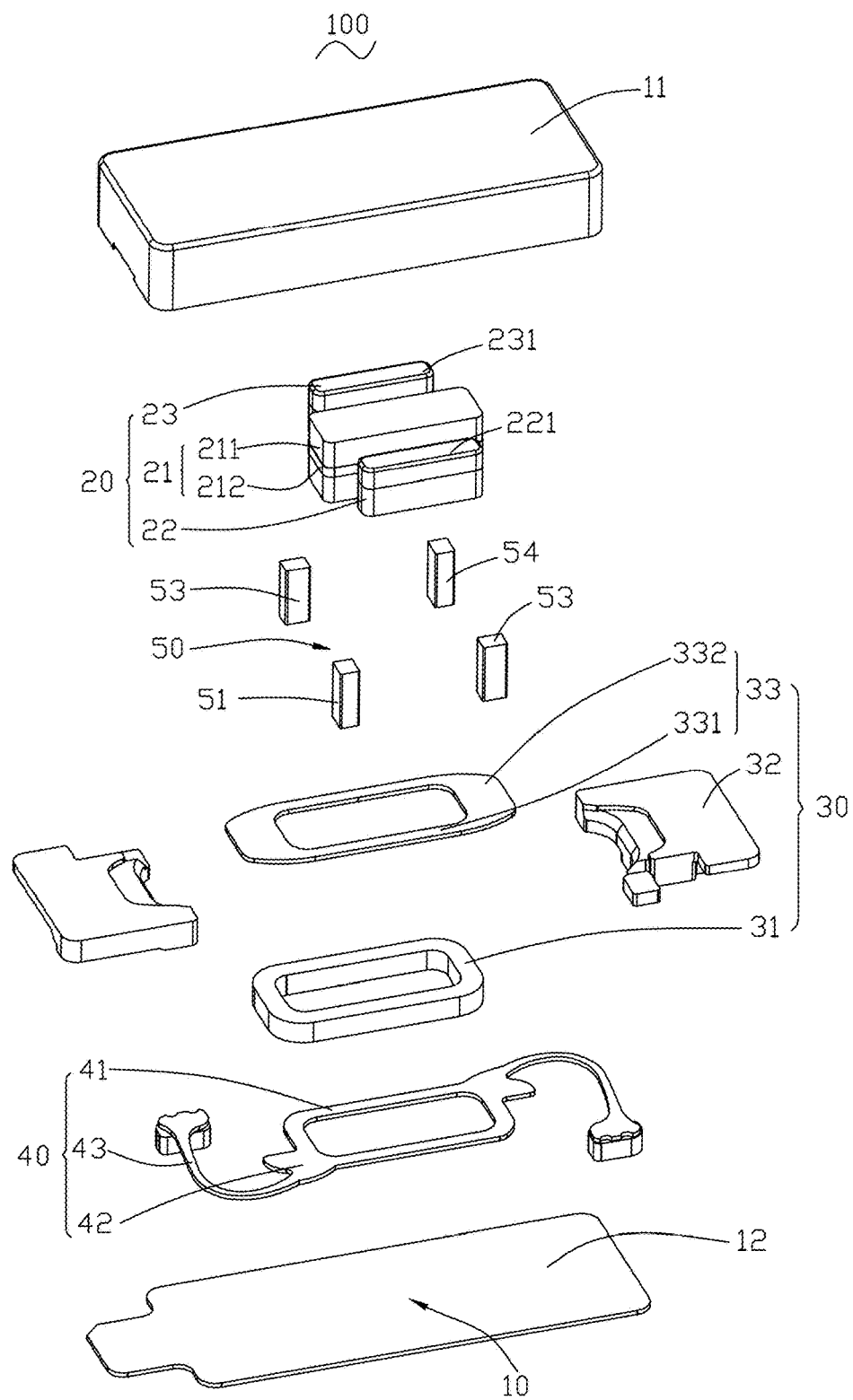
FIG. 2 is a structural exploded view of the vibration motor shown in FIG. 1.
Figure 3:
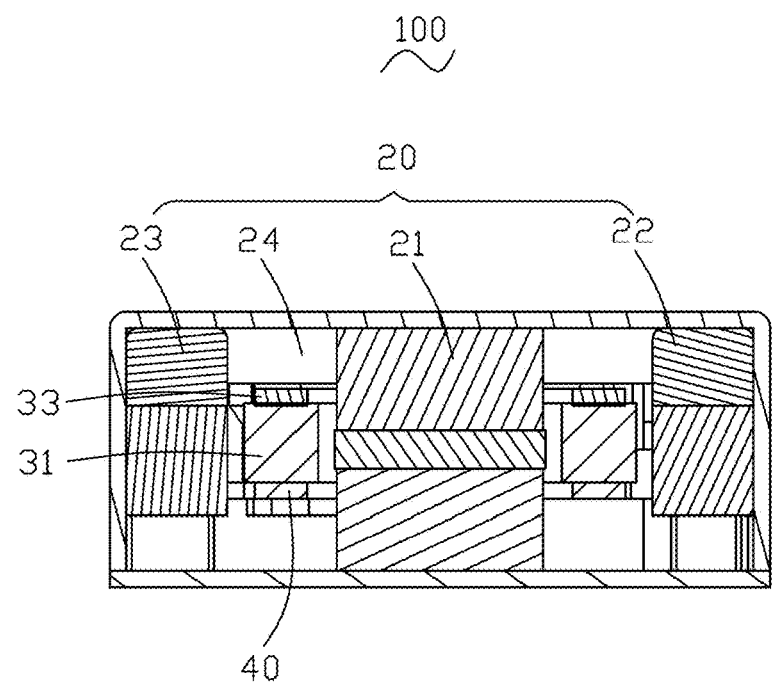
FIG. 3 is a cross-sectional view of the vibration motor shown in FIG. 1 along an A-A line.
Figure 4:
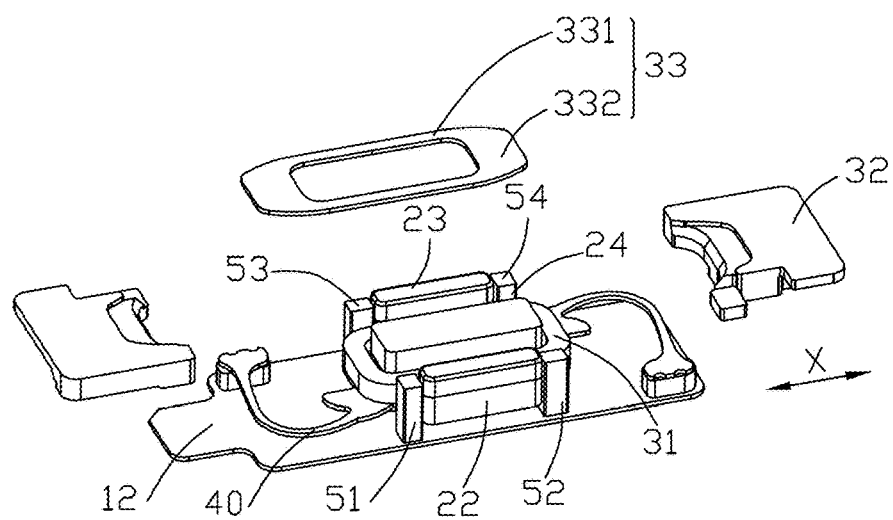
FIG. 4 is a partial structural exploded view of the vibration motor shown in FIG. 1 after the shell is removed.
Figure 5:
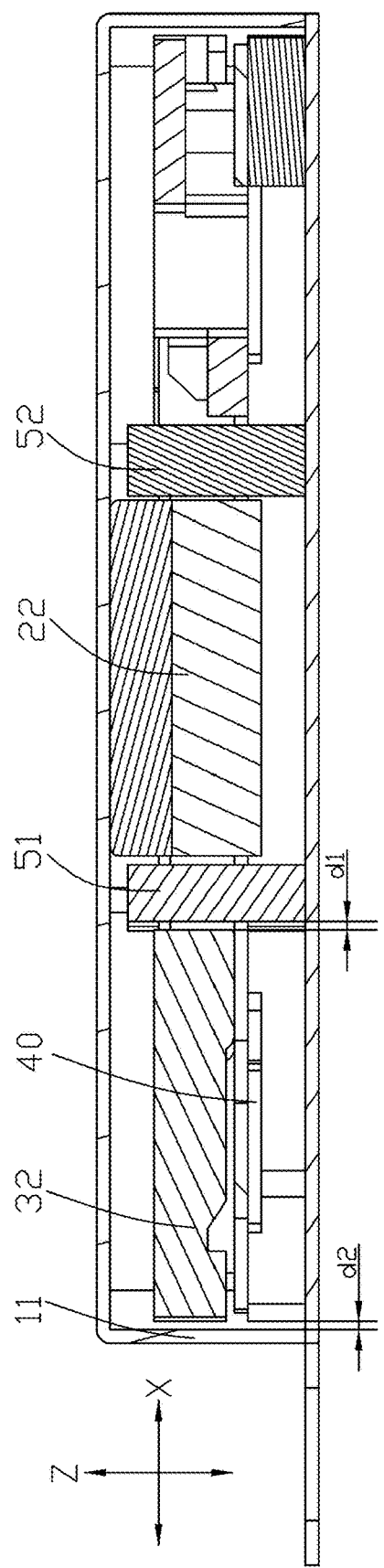
FIG. 5 is a cross-sectional view of the vibration motor shown in FIG. 1.

The present disclosure will be described in detail below with reference to the attached drawings and embodiments thereof.

Referring to FIGS. 1-5, the present disclosure discloses a vibration motor 100, which includes a housing 10, a magnet module 20 received in the housing 10, a vibration module 30, an elastic support 40 and a circuit board (not shown in the figures).

The housing 10 includes a shell 11 and a cover plate 12. The shell 11 is matched with the cover plate 12 to form a receiving space. The magnet module 20 is fixed on the shell 11. The vibration module 30 is suspended in the receiving space via the elastic support 40, and vibrates reciprocally in the Z direction shown in FIG. 5. The circuit board is fixed on the cover plate 12. Of course, in other embodiments, the magnet module 20 can also be fixed on the cover plate 12, and the circuit board can also be fixed on the elastic support 40.

The magnet module 20 includes a main magnet unit 21, a first vice magnet unit 22 and a second vice magnet unit 23. The first vice magnet unit 22 and the second vice magnet unit 23 are symmetrically disposed on two sides of the main magnet unit 21. The main magnet unit 21 is spaced from the first vice magnet unit 22 and the second vice magnet unit 23 to form a magnetic gap 24 respectively.

The main magnet unit 21 further includes two main magnets 211 which are superposed with each other and are homopolarly opposite and a main pole plate 212 sandwiched between the two main magnets 211. The first vice magnet unit 22 includes two first vice magnets 221 which are superposed with each other and are homopolarly opposite. The second vice magnet unit 23 also includes two second vice magnets 231 which are superposed with each other and are homopolarly opposite. The polarity of the main magnet unit 21 is opposite to the polarity of the first vice magnet unit 22 and the polarity of the second vice magnet unit 23.

The vibration module 30 includes a coil 31 inserted into the magnetic gaps 24, masses 32 for clamping the coil 31, and a connector 33 for connecting the coil 31 with the masses 32. The elastic support 40 and the connector 33 are separately disposed on two opposite sides of the masses 32; that is, the coil 31 and the masses 32 are sandwiched between the connector 33 and the elastic support 40. In this embodiment, two masses 32 are provided, and the two masses 32 are symmetrically disposed at two ends of the coil 31 in the length direction X of the housing, in order to stably clamp the coil 31 from the two ends. Of course, in other embodiments, the two masses 32 can also be integrated, that is, the vibration module 30 includes only one mass 32, as long as the mass can clamp the coil 31.

The connector 33 includes a coil connecting portion 331 and a mass connecting portion 332. The coil connecting portion 331 is matched with the coil 31 in shape, and the mass connecting portion 332 extends towards the adjacent masses 32 from the two ends of the coil connecting portion 331 respectively. The coil 31 is connected with the coil connecting portion 331, and the masses 32 are connected with the mass connecting portion 332.

The overall elastic support 40 is of a centrosymmetric structure, and includes a coil supporting portion 41, a mass supporting portion 42 and a deformation portion 43. The coil supporting portion 41 is matched with the coil 31 in shape, the mass supporting portion 42 extends towards the adjacent masses 32 from the two ends of the coil supporting portion 41, and the deformation portion 43 is connected with the mass supporting portion 42. The coil supporting portion 41 is connected with the coil 31, and the mass supporting portion 42 is connected with the masses 32. In this embodiment, the deformation portion 43 is roughly arc-shaped, and is of a centrosymmetric structure about the coil 31. One end of the deformation portion 43 is connected with the mass supporting portion 42, and the other end is fixedly connected with the housing 10 by an additional connector.

In this embodiment, a stop module 50 is further disposed between the masses 32 and the first vice magnet unit 22 and between the masses 32 and the second vice magnet unit 23, and is used for limiting the amplitude of the masses 32. The stop module 50 includes a first stop 51 and a second stop 52 disposed on two opposite sides of the first vice magnet unit 22, as well as a third stop 53 and a fourth stop 54 disposed on two opposite sides of the second vice magnet unit, in the length direction X of the housing. The first stop 51, the second stop 52, the third stop 53 and the fourth stop 54 are cubic, and are independent from one another.

In this embodiment, in the length direction X of the housing, the distance d1 between the mass 32 and the adjacent stop (taking the first stop 51 as an example for illustrating in FIG. 5) is shorter than the distance d2 between the mass 32 and the housing 10. Thus, when the masses 32 drop in the length direction, the stop module 50 can play a role in limiting the masses 32, thereby preventing the front masses from impacting the coil and the connector in the dropping direction and then effectively preventing deformation of the coil and the connector.

Therefore, the stop module 50 is disposed between the masses and the vice magnet units in the vibration motor 100, and the masses 32 are not only limited by means of the housing 10 but also limited by the stop module 50. When the masses 32 drop in the length direction, the stop module 50 can play a role in limiting the masses 32, thereby preventing the front masses from impacting the coil 31 and the connector in the dropping direction and then effectively preventing deformation of the coil 31 and the connector.

Figure 6:
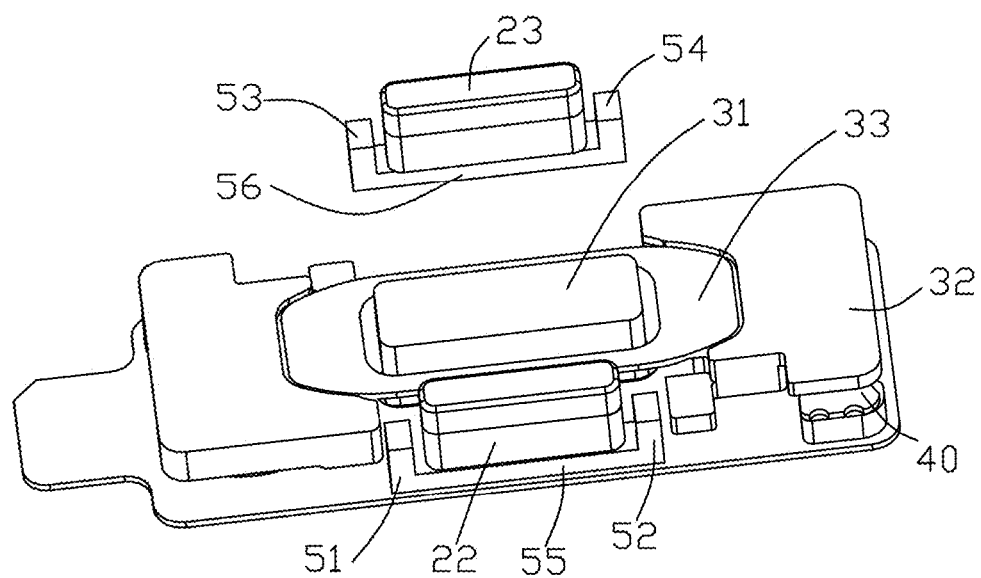
FIG. 6 is a partial structural exploded view of another embodiment of the vibration motor of the present disclosure after the shell is removed.
Figure 7:
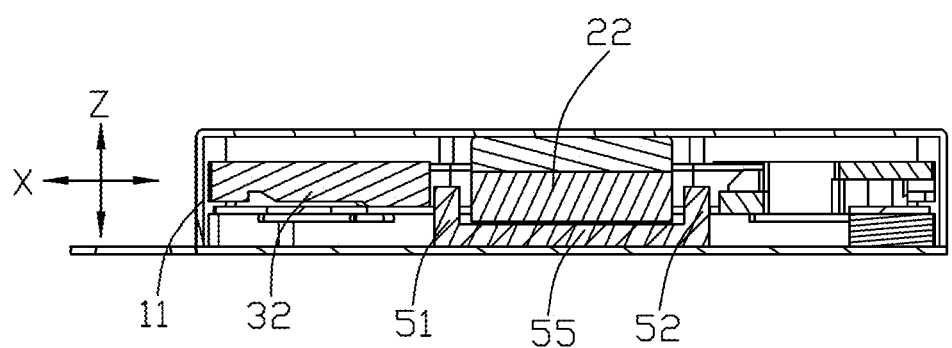
FIG. 7 is a cross-sectional view of the vibration motor shown in FIG. 6.

Referring to FIGS. 6 and 7, FIG. 6 is a partial structural exploded view of another embodiment of the vibration motor of the present disclosure after the shell is removed, and FIG. 7 is a cross-sectional view of the vibration motor shown in FIG. 6. The stop module 50 further includes a first stop connecting portion 55 and a second stop connecting portion 56. The first stop connecting portion 55 connects the first stop 51 and the second stop 52, and the second stop connecting portion 56 connects the third stop 53 and the fourth stop 54. The first stop connecting portion 55 and the second stop connecting portion 56 are fixed on the cover plate 12 of the housing 10, and extend in the length direction X of the housing 10. In this embodiment, a gap is reserved between the first stop connecting portion 55 and the first vice magnet unit 22 in the vibrating direction Z, and a gap is reserved between the second stop connecting portion 56 and the second vice magnet unit 23 in the vibrating direction Z.

The two stops located on the two opposite sides of the same vice magnet unit are connected with each other by the stop connecting portion, and the stop connecting portion and the two stops connected with the stop connecting portion can be integrated, so that the stop module is more convenient to assemble and higher in reliability.

Figure 8:
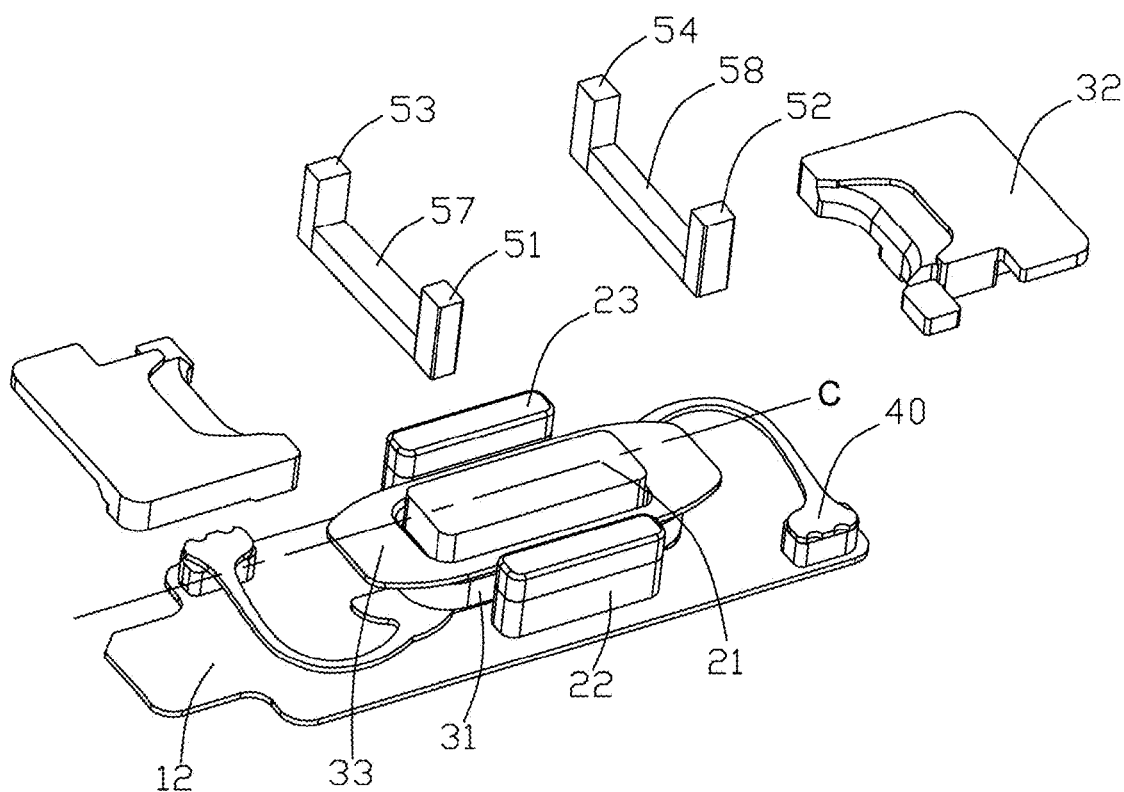
FIG. 8 is a partial structural exploded view of another embodiment of the vibration motor of the present disclosure after the shell is removed.
Figure 9:
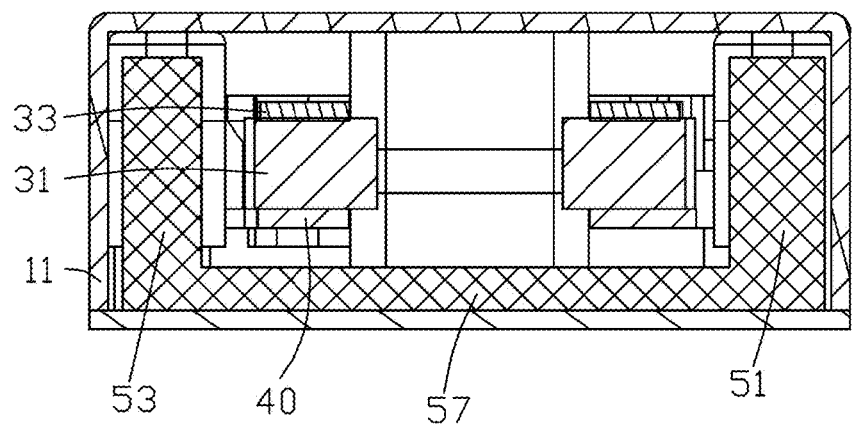
FIG. 9 is a cross-sectional view of the vibration motor shown in FIG. 8.

Referring to FIGS. 8 and 9, FIG. 8 is a partial structural exploded view of another embodiment of the vibration motor of the present disclosure after the shell is removed, and FIG. 9 is a cross-sectional view of the vibration motor shown in FIG. 8. In this embodiment, the housing 10 is provided with a center shaft C extending in the length direction X and penetrating through the center of the housing 10. The first stop 51 and the third stop 53 are symmetrical about the center shaft C, and the second stop 52 and the fourth stop 54 are symmetrical about the center shaft C. The stop module 50 further includes a third stop connecting portion 57 for connecting the first stop 51 and the third stop 53, and a fourth stop connecting portion 58 for connecting the second stop 52 and the fourth stop 54. The third stop connecting portion 57 and the fourth stop connecting portion 58 extend perpendicular to the length direction X of the housing 10. In this embodiment, the third stop connecting portion 57 is integrated with the first stop 51 and the third stop 53, and the fourth stop connecting portion 58 is integrated with the second stop 52 and the fourth stop 54. By adopting the structure, the stop module is convenient to assemble, and the reliability of the whole stop module is relatively high.

Compared with the prior art, the vibration motor provided by the present disclosure has the advantages that the stop module is disposed between the masses and the vice magnet units, and when the masses drop in the length direction, the stop module can play a role in limiting the masses, thereby preventing the front masses from impacting the coil and the connector in the dropping direction and then effectively preventing deformation of the coil and the connector.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A vibration motor, comprising:
   a housing;
   a magnet module, received in the housing and fixedly connected with the housing, the magnet module comprising a main magnet unit as well as a first vice magnet unit and a second vice magnet unit symmetrically disposed on two sides of the main magnet unit, and the main magnet unit being spaced from the first vice magnet unit and the second vice magnet unit to form magnetic gaps;
   a vibration module, comprising a coil inserted into the magnetic gaps and masses for clamping the coil; and
   an elastic support, configured for connecting the coil and the masses to suspend the vibration module in the housing;
   wherein a stop module for limiting the amplitude of the masses is disposed between the masses and the first vice magnet unit and between the masses and the second vice magnet unit.

2. The vibration motor as described in claim 1, wherein the stop module includes a first stop and a second stop disposed on two opposite sides of the first vice magnet unit, as well as a third stop and a fourth stop disposed on two opposite sides of the second vice magnet unit in the length direction of the housing.

3. The vibration motor as described in claim 2, wherein the distance between the mass and the adjacent stop is shorter than the distance between the mass and the housing in the length direction of the housing.

4. The vibration motor as described in claim 2, wherein the stop module further includes a first stop connecting portion extending in the length direction of the housing and connecting the first stop and the second stop, and a second stop connecting portion connecting the third stop and the fourth stop; both the first stop connecting portion and the second stop connecting portion are fixed on the housing; the first stop, the second stop and the first stop connecting portion are integrated; and the third stop, the fourth stop and the second stop connecting portion are integrated.

5. The vibration motor as described in claim 4, wherein the stop module further includes a third stop connecting portion for connecting the first stop and the third stop, and a fourth stop connecting portion for connecting the second stop and the fourth stop; the third stop connecting portion and the fourth stop connecting portion extend perpendicular to the length direction of the housing.

6. The vibration motor as described in claim 1, wherein two masses are provided, and the two masses are symmetrically disposed on two sides of the coil in the length direction of the housing.

7. The vibration motor as described in claim 6, wherein the vibration module further comprises a connector for connecting the coil and the masses, and the connector is disposed on the side of the masses opposite to the elastic support.

8. The vibration motor as described in claim 7, wherein the connector includes a coil connecting portion matched with the coil in shape, and a mass connecting portion extending towards the adjacent masses from the two ends of the coil connecting portion; the coil is connected with the coil connecting portion, and the mass connecting portion is connected with the masses.

9. The vibration motor as described in claim 7, wherein the elastic support comprises a coil supporting portion connected with the coil, a mass supporting portion extending towards the adjacent masses from the two ends of the coil supporting portion, and a deformation portion connected with the mass supporting portion and also fixedly connected with the housing.

10. The vibration motor as described in claim 9, wherein the deformation portion is arc-shaped, and is of a centrosymmetric structure about the coil.

11. The vibration motor as described in claim 1, wherein the main magnet unit includes two main magnets which are superposed with each other and are homopolarly opposite and a main pole plate sandwiched between the two main magnets.

12. The vibration motor as described in claim 11, wherein the first vice magnet unit includes two first vice magnets which are superposed with each other and are homopolarly opposite, and the second vice magnet unit includes two second vice magnets which are superposed with each other and are homopolarly opposite.

13. The vibration motor as described in claim 1, wherein the polarity of the main magnet unit is opposite to the polarity of the first vice magnet unit and the polarity of the second vice magnet unit.

14. The vibration motor as described in claim 2, wherein the main magnet unit includes two main magnets which are superposed with each other and are homopolarly opposite and a main pole plate sandwiched between the two main magnets.

15. The vibration motor as described in claim 3, wherein the main magnet unit includes two main magnets which are superposed with each other and are homopolarly opposite and a main pole plate sandwiched between the two main magnets.

16. The vibration motor as described in claim 4, wherein the main magnet unit includes two main magnets which are superposed with each other and are homopolarly opposite and a main pole plate sandwiched between the two main magnets.

17. The vibration motor as described in claim 5, wherein the main magnet unit includes two main magnets which are superposed with each other and are homopolarly opposite and a main pole plate sandwiched between the two main magnets.

18. The vibration motor as described in claim 6, wherein the main magnet unit includes two main magnets which are superposed with each other and are homopolarly opposite and a main pole plate sandwiched between the two main magnets.

19. The vibration motor as described in claim 7, wherein the main magnet unit includes two main magnets which are superposed with each other and are homopolarly opposite and a main pole plate sandwiched between the two main magnets.

20. The vibration motor as described in claim 8, wherein the main magnet unit includes two main magnets which are superposed with each other and are homopolarly opposite and a main pole plate sandwiched between the two main magnets.

* * * * *